April 7, 1925.
W. C. RUSSELL ET AL
1,532,603
LOCK NUT
Original Filed Dec. 26, 1922
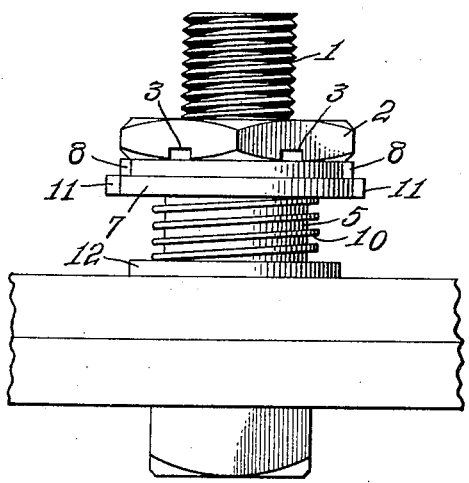
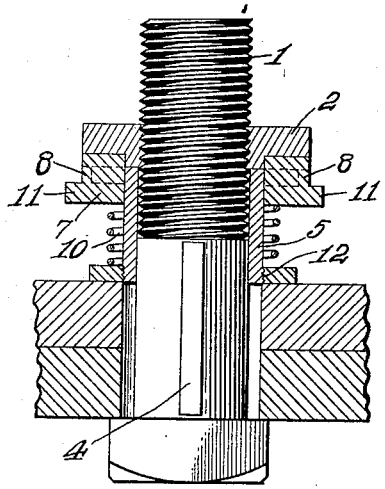
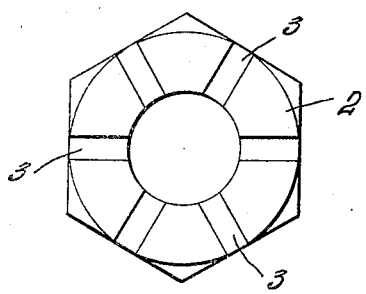
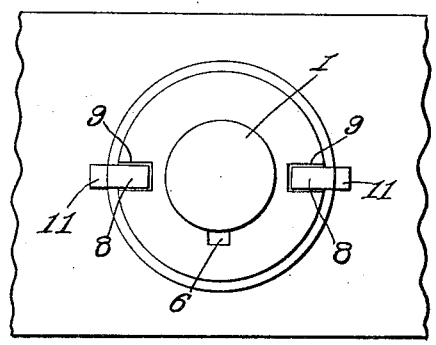
William C. Russell
John F. Canady
INVENTOR
BY Victor J. Evans
ATTORNEY
WITNESS:

Patented Apr. 7, 1925.

1,532,603

UNITED STATES PATENT OFFICE.

WILLIAM C. RUSSELL AND JOHN F. CANADY, OF PENDLETON, OREGON; SAID RUSSELL ASSIGNOR TO SAID CANADY.

LOCK NUT.

Application filed December 26, 1922, Serial No. 609,024. Renewed November 22, 1924.

*To all whom it may concern:*

Be it known that we, WILLIAM C. RUSSELL and JOHN F. CANADY, citizens of the United States, residing at Pendleton, in the county of Umatilla and State of Oregon, have invented new and useful Improvements in Lock Nuts, of which the following is a specification.

This invention relates to a lock nut, the general object of the invention being to provide a sleeve for fitting over the bolt and having a spring pressed part thereon for engaging a recess in the nut to hold the same against turning.

Another object of the invention is to provide means for replacing the spring whenever desired.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a side view showing the invention in use.

Figure 2 is a sectional view.

Figure 3 is a plan view of the nut.

Figure 4 is a plan view of Figure 1.

In these views 1 indicates the bolt and 2 the nut thereof, the under face of which is provided with the notches 3. The bolt is provided with a key 4. A spool or sleeve 5 is adapted to be placed on the bolt with a key-way 6 engaging the key 4 so that the sleeve is held against rotary movement. A washer 7 is placed on the sleeve or spool and said washer is provided with the projections 8 which are adapted to extend through the notches 9 in one of the flanges of the spool to engage some of the notches in the nut so as to hold the said nut against rotary movement. The washer is held against the flange by means of the spring 10 on the spool or sleeve. The washer is provided with the thumb engaging parts 11 for facilitating the washer being pressed inwardly so that its projections can be moved out of the notches in the nut to permit the nut to be turned. The other flange of the spool has screw threaded engagement with the body thereof, as shown at 12, so that the flange can be removed in order to place the washer and spring on the spool and by this arrangement of parts a new spring can be substituted for the old one whenever desired or necessary.

From the above it will be seen that the projections on the washer engaging the notches in the nut will firmly hold the same against turning movement and thus lock the same on the bolt.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

In combination with a bolt and its nut, said nut having notches therein, a spool on the bolt and located between the work-piece and the nut and having notches in one flange thereof, a washer on the spool having projections thereon for engaging the notches in the flange and in the nut, a spring on the spool for holding the washer against the notched flange and means for detachably connecting one flange with the spool.

In testimony whereof we affix our signatures.

WILLIAM C. RUSSELL.
JOHN F. CANADY.